Figure 1:
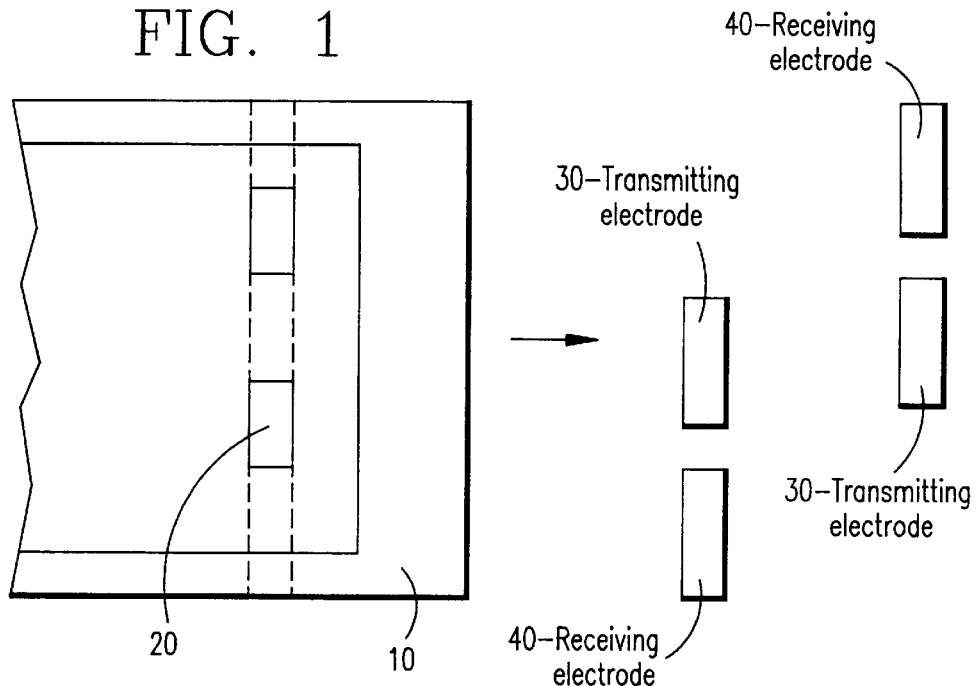

United States Patent
Gerz

[19]
[11] Patent Number: 6,094,147
[45] Date of Patent: Jul. 25, 2000

[54] METHOD FOR DETECTING AN ELECTROCONDUCTIVE ELEMENT IN A DOCUMENT

[75] Inventor: Christoph Gerz, Otterfing, Germany

[73] Assignee: Giesecke & Devrient GmbH, Germany

[21] Appl. No.: 08/894,370

[22] PCT Filed: Dec. 20, 1996

[86] PCT No.: PCT/EP96/05767

§ 371 Date: Oct. 28, 1997

§ 102(e) Date: Oct. 28, 1997

[87] PCT Pub. No.: WO97/23848

PCT Pub. Date: Jul. 3, 1997

[30] Foreign Application Priority Data

Dec. 22, 1995 [DE] Germany .......................... 195 48 532

[51] Int. Cl.[7] .................................................. G07D 7/00
[52] U.S. Cl. ............................. 340/825.54; 340/825.34; 340/568.7; 194/206; 235/451
[58] Field of Search .................... 340/825.54, 825.34, 340/825.72, 568.7, 572.1, 572.4; 194/206, 213, 302, 304, 306, 317; 235/451; 455/41, 106; 382/135; 324/239, 658, 660, 663, 672; 209/534

[56] References Cited

U.S. PATENT DOCUMENTS

| | | | |
|---|---|---|---|
| 4,255,652 | 3/1981 | Weber | 235/451 |
| 5,417,316 | 5/1995 | Harbaugh | 194/206 |
| 5,419,424 | 5/1995 | Harbaugh | 194/206 |
| 5,614,824 | 3/1997 | Dames et al. | 324/239 |

FOREIGN PATENT DOCUMENTS

| | | |
|---|---|---|
| 4339417 | 5/1995 | Germany . |
| 4405860 | 8/1995 | Germany . |

*Primary Examiner*—Edwin C. Holloway, III
*Attorney, Agent, or Firm*—Bacon & Thomas PLLC

[57] ABSTRACT

The invention relates to a method for detecting an electroconductive element in a document, a signal with a modulated carrier frequency being coupled to at least one transmitting electrode. This signal is transmitted via the elecroconductive element to at least one receiving electrode, the received modulated signal being evaluated for detecting the electroconductive element. The electroconductive element in the document constitutes a capacitive coupling element between the transmitting and receiving electrodes.

14 Claims, 1 Drawing Sheet

METHOD FOR DETECTING AN ELECTROCONDUCTIVE ELEMENT IN A DOCUMENT

This invention relates to a method for detecting an electroconductive element in a document according to the preamble of claim 1.

A method of the aforementioned kind is known e.g. from DE 43 39 417 A1. In the known method, the high-frequency signal produced by an oscillator is applied to a transmitting electrode. The transmitted signal is transmitted via the electroconducive security thread to the receiving electrode and evaluated in an evaluating circuit. The security thread is recognized as genuine by the evaluating circuit if amplitude and phase position of the transmitted signal match the input signal on the transmitter.

A problem in detecting security threads in a document is that for example a moist document can cause a signal due to the electrolytic conduction although the document has no security thread. Reliable differentiation of the signal transmitted from the transmitting to the receiving electrode due to the metallic conduction of the security thread from a signal caused by the electrolytic conduction in the document is impeded, however, by the high capacitive coupling resistances present between the transmitting and receiving electrodes. At a working frequency in the 100 kHz range these resistances can be in the order of magnitude of megaohms for example, and are thus very much greater than the resistance of the metallic security thread, which can be e.g. in the kiloohm range. Due to the high capacitive coupling resistances, the contribution of the security thread can no longer be exactly detected during measurement. This is important in order to ensure reliable detection of the security thread in the document.

The invention is thus based on the problem of proposing a simple and more reliabie method for detecting an electroconductive element in a document.

this problem is solved according to the invention by the features stated in characterizing part of he "independent" claims.

The basic idea of the invention is that for detecting an electroconductive element in a document a signal with a modulated carrier frequency is coupled to at least one transmitting electrode and transmitted by means of the electrconductive element to at least one receiving electrode, the received modulated signal being evaluated for detecting the electroconductive element. The electroconductive element acts as a capacitive coupling element between the transmitting and receiving electrodes.

The capacitively transmitted modulated carrier frequency signal is preferably mixed onto the modulation frequency on the receiver side. The signal with the modulation frequency can then be evaluated as to amplitude for detecting the electroconductive element. The signal can be filtered and amplified prior to evaluation. By reason of component availability and costs, a value of e.g. 455 kHz as is usual in radio technology is preferably selected as the modulation frequency. For modulating the carrier frequency signal one can use amplitude modulation, whereby the carrier frequency can be in the MHz range and the modulation frequency in the kHz range.

By using a very high carrier frequency in comparison to the modulation frequency one can reduce the capacitive coupling resistances between the transmitting and receiving electrodes considerably, e.g. by a factor of $10^3$, which permits more exact detection of the electroconcuctive elements. Due to the low capacitive coupling resistances, which are e.g. in the kiloohm range, the inventive method is insensitive to moisture in the documents.

Since the modulated carrier frequency is mixed with the same carrier frequency, only a UHF oscillator is required for the transmitting and receiving electrodes. One can use e.g. a simple LC oscillator. This permits the method to be carried out with low technical effort.

In a development, a plurality of transmitting and receiving electrodes can also be provided for detecting the electroconductive element in the document. The transmitting and receiving electrodes of an electrode pair are disposed linearly to each other. Each electrode pair corresponds to a measuring track. The electrode pairs are disposed so that the measuring tracks do not disturb each other. The use of a plurality of measuring tracks has the advantage that the electroconductive element can be detected reliably even with a skew of the documents to be tested. Due to the increased number of measuring tracks there is also less likelihood of any cracks in security threads being located exactly where they impair detect on. This can also reduce the sensitivity to cracks in the security thread during measurement.

Figure 2:
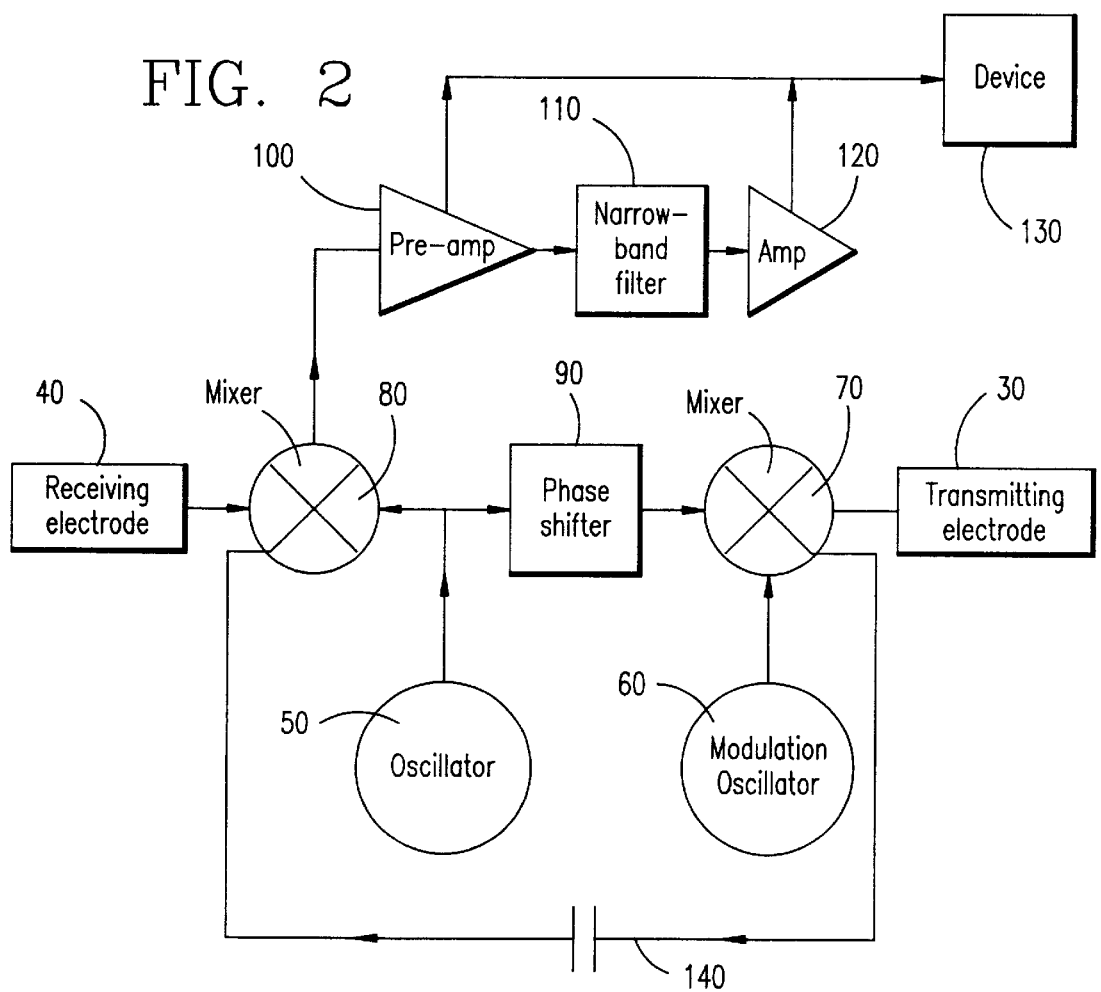

Further advantages and developments of the invention result from the dependent claims and the following description of an embodiment of the invention with reference to the enclosed figures, in which:

FIG. 1 shows a schematic ropresentation of the arrangement of the transmitting and receiving electrodes, FIG. 2 shows a block diagram of the inventive solution.

FIG. 1 shows by way of example two electrode pairs each having transmitting electrode 30 and receiving electrode 40 for detecting an electroconductive element in a document. Document 10 can be for example a bank note in which metallic security thread 20 is embedded in the known way. Electrodes 30, 40 preferably have a width essentially matching the width of the security thread. For example the electrodes can have a width of 1.5 mm. The transmitting and receiving electrodes of an electrode pair can be disposed at a distance of e.g. 5 mm. The electrode pairs can extend over the total width of the document. The electrode pairs are to be disposed such that when the security thread is located in the area of the electrodes the measured signals capacitively coupled over from the particular transmitting electrode to the particular receiving electrode do not disturb each other. The number of measuring tracks increased by the arrangement of a plurality of electrode pairs is advantageous in particular upon a skew of the documents to be tested. Also, with a multitrack electrode arrangement extending over the total width of the document one can detect the length of the security thread.

However, only one electrode pair consisting of a transmitting and a receiving electrode can of course also be sufficient for detecting the electroconductive element in the document, in particular when no detection of the total length of the security thread is desired. The transmitting and receiving electrodes should then preferably be disposed in center to the document moved past the electrodes, so that the security thread can cause the signal to be coupled over from the transmitting to the receiving electrode even with a skew of the document.

According to the invention, a modulated signal is coupled to the transmitting electrode and the capacitive transmission of the modulated signal to the transmitting electrode measured. Transmission of the modulated signal only takes place if the electroconductive element is located in the area of the transmitting and receiving electrodes.

FIG. 2 shows oscillator 50 for producing a carrier frequency signal, e.g. of about 220 MHz, and modulation oscillator 60 whose frequency is fixed e.g. at 455 kHz The signal from the carrier frequency oscillator is supplied via phase shifter 90, which e.g. eliminates an undesirable phase shift obtained due to stray capacitances, to mixer 70 and multiplied by the modulation frequency there. The modulation used is a 200% amplitude modulation. The modulated carrier frequency signal obtained by mixer 70 is supplied to transmitting electrode 30 and transmitted to receiving electrode 40 by means of the electroconductive element not shown here. The signal obtained at receiving electrode 40 is supplied to further mixer 80 and mixed with the same carrier frequency there, thereby recovering the modulation frequency of 455 kHz. The modulated carrier frequency signal can be mixed e.g. by proper-phase multiplication of the modulated carrier frequency signal by the same carrier frequency. The signal with the modulation frequency can be supplied to narrow-band filter 110 via preamplifier 100. The filter serves to suppress noise and permits a narrow-band gain of the measured signal in amplifier 120. The output signal from amplifier 120, which is proportional to the logarithm of the signal amplitude and has a band width of e.g. 3 kHz, is then supplied to device 130 which evaluates the amplified measured signal e.g. as to amplitude. In order to obtain the best possible signal yield one can conpensate away the signal fraction which couples over from the transmitting electrode to the receiving electrode without an electroconductive element. This can be done for example by feedback 140 of the complementary output of mixer 70 to receiving electrode 40.

What is claimed is:

1. A method for detecting an electroconductive element in a document, comprising the steps of:

generating a modulated carrier frequency signal by multiplying a carrier frequency signal by a modulation frequency signal;

coupling the modulated carrier frequency signal to at least one transmitting electrode;

capacitively transmitting the coupled modulated signal to at least one receiving electrode via the electroconductive element in the document; and evaluating the received modulated signal for detecting the electroconductive element in the document.

2. The method according to claim 1 further comprising the step of:

mixing the capacitively transmitted modulated signal with the same carrier frequency signal.

3. The method according to claim 2, further comprising the step of:

amplifying and filtering the mixed modulated signal before it is evaluated;

wherein the step of evaluating includes evaluating the mixed modulated signal as to amplitude.

4. The method according to claim 1, wherein the modulated carrier frequency signal is modulated by an amplitude modulation.

5. The method according to claim 4, wherein the amplitude modulation is 200%.

6. The method according to claim 5, wherein the carrier frequency signal is in the MHz range and the modulation frequency signal is in the kHz range.

7. The method according to claim 6 wherein the carrier frequency signal is about 220 MHz and the modulation frequency signal is about 455 kHz.

8. The method according to claim 4, wherein the carrier frequency signal is in the MHz range and the modulation frequency signal is in the kHz range.

9. The method according to claim 8, wherein the carrier frequency signal is about 220 MHz and the modulation frequency signal is about 455 kHz.

10. An apparatus for detecting an electroconductive element in a document, comprising:

a first oscillator (50) arranged to produce a high-frequency signal;

at least one transmitting electrode (30) arranged to capacitively transmit a signal coupled thereto;

at least one receiving electrode (40) disposed linearly with respect to the at least one transmitting electrode (30);

a second oscillator (60) arranged to produce a modulated signal;

a mixer (70) arranged to receive the high-frequency signal from the first oscillator (50) and the modulated signal from the second oscillator (60) and arranged to output a modulated carrier frequency signal which is coupled to the at least one transmitting electrode (30).

11. The apparatus of claim 10, wherein a plurality of transmitting and receiving electrodes (30, 40) are provided.

12. The apparatus according to claim 10, further comprising:

a phase shifter (90) arranged to supply the high-frequency signal from the first oscillator (50) to the mixer (70).

13. The apparatus according to claim 12, further comprising:

a second mixer (80) arranged to mix the modulated carrier frequency signal, once it has been transmitted to the receiving electrode (40), with the same high-frequency signal.

14. The apparatus according to claim 13, further comprising:

a pre-amplifier (100) arranged to amplify the mixed signal from the second mixer (80);

a narrow-band filter (110) arranged to filter the amplified signal;

an amplifier (120) arranged to amplify the filtered signal and to produce an output signal; and a device (130) arranged to evaluate the output signal from the amplifier (120).

* * * * *